INVENTORS
WILHELMUS F. KNIPPENBERG
GERRIT VERSPUI

United States Patent Office 3,721,732
Patented Mar. 20, 1973

3,721,732
METHOD OF MANUFACTURING FILAMENTARY BODIES OF CIRCULAR CROSS-SECTION CONSISTING OF SILICON CARBIDE SINGLE CRYSTALS AND FILAMENTARY BODIES OBTAINED BY SAID METHOD
Wilhelmus Franciscus Knippenberg and Gerrit Verspui, Emmasingel, Eindhoven, Netherlands, assignors to U.S. Philips Corporation, New York, N.Y.
Continuation-in-part of application Ser. No. 690,005, Dec. 12, 1967. This application Mar. 7, 1968, Ser. No. 711,349
Claims priority, application Netherlands, Mar. 8, 1967, 6703609
Int. Cl. C01b 31/36; B01j 17/32, 17/00
U.S. Cl. 423—346                                   7 Claims

ABSTRACT OF THE DISCLOSURE

A method of manufacturing filamentary bodies of silicon carbide having a circular cross-section in which iron is heated on a substrate to a temperature between 1150 and 1230° C. while gaseous compounds containing silicon and carbon are decomposed over the substrate and the silicon carbide thus formed absorbed by the iron droplets which become supersaturated and deposit the silicon carbide which is formed as a filamentary body having a circular cross-section.

Figure 1:
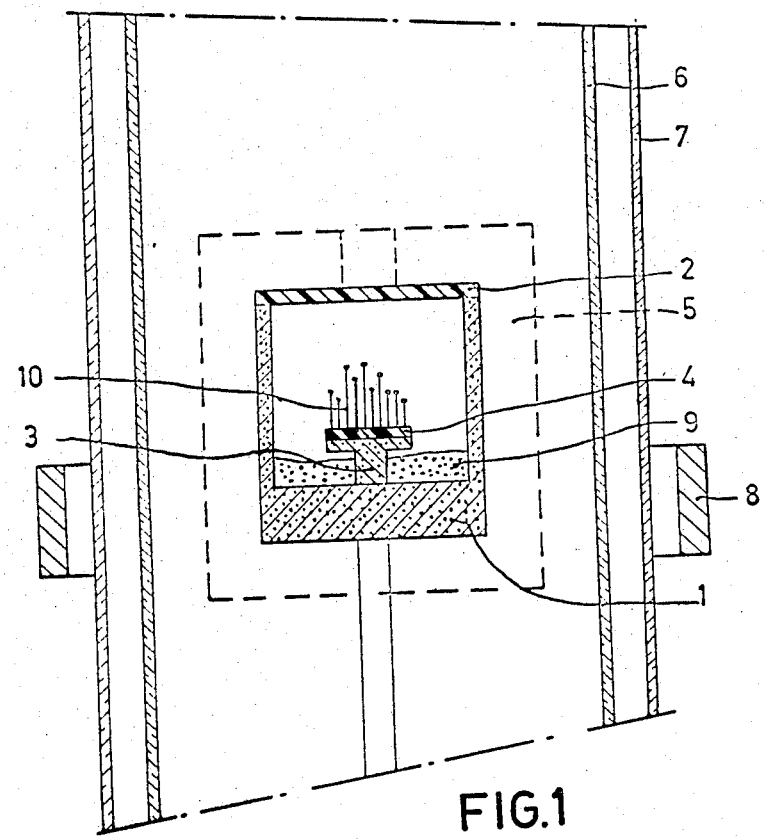

This application is a continuation in-part of application Ser. No. 690,005, filed Dec. 12, 1967.

This invention relates to the manufacture of filamentary bodies, so-called "whiskers" of circular cross-section consisting of silicon carbide single crystals.

Several method of manufacturing filamentary crystals (whiskers) of silicon carbide have previously been described in literature. (British patent specification No. 1,015,844; Proc. Conf. on Silicon Carbide, Boston, 1959, page 73 ff., Pergamon Press 1960; Physical Rev. 143 (1966) 526; Transactions Metallurgical Soc. AIME 233 (1965) 1053.)

The yield of whiskers and their dimensions differed greatly. The cross-sections of the whiskers in one charge were also different. Insofar whiskers, having a length of a few centimetres were obtained they were polygonal in cross-section or ribbon-shaped. Whiskers of circular cross-section were obtained on a small scale and even then with small dimensions only, such as lengths of a few millimetres and thicknesses of a few microns.

For the conventional uses of these whiskers, such as for reinforcing plastics, glass and metals, for insulating purposes and for filters, the differences in dimensions and the shape of the cross-section of the whiskers obtained were of minor importance. The essential point was only the relevant crystals, whiskers, could be manufactured in sufficient quantities in a simple manner.

For other applications, where the known advantageous mechanical properties of silicon carbide single crystals could likewise be utilized, such as for spindles of micromotors and watches, for plug-gauges and the like, it is necessary, however, to have the disposal of whiskers of circular cross-section and narrow tolerances of this cross-section and with a suitable length and thickness.

An object of the invention is to manufacture such silicon carbide whiskers.

Investigations which have led to the present invention revealed that whiskers satisfying these requirements can be obtained by VLS-growth (vapour-liquid-solid) in a very limited range of temperatures.

The term VLS-growth is to be understood, such as known from Trans.-Metallurgical Soc. AIME 233 (1965) 1053–1064, to mean a method of crystallization in which in a molten drop of a metal which serves as a transport phase for the material to be crystallised, this material is absorbed from a gas phase and deposited from the drop on a substrate.

According to the last-mentioned publication single crystals of silicon carbide could thus be obtained using silicon as the transport phase.

However, it has been found that the use of iron in VLS-growth of silicon carbide whiskers is very advantageous with regard to the yield, the dimensions of the whiskers and the uniformity of their dimensions.

It is not necessary to use the iron in a pure state. As a matter of fact, the iron may without objection already contain carbon and silicon or other elements. However, any improvement in the growth of the crystals as a result of the presence of alloying elements has not been found.

In connection therewith the term "iron" is to be understood in this description and the claims to include carbon steels and alloyed steels.

It has also been found that the desired circular cross-section of the crystals is obtained by carrying out the crystallisation in a very limited range of temperatures, namely between 1150° C. and 1230° C., preferably between 1180° C. and 1210° C. Little or no crystal growth is obtained at lower temperatures, whereas troublesome deviations from the circular cross-section occur at higher temperatures.

The present invention, which is based on this fact, relates to a method of manufacturing filamentary bodies, so-called "whiskers" of circular cross-section consisting of silicon carbide single crystals, in which the silicon carbide is deposited from a gas phase by means of VLS-growth on a substrate, and it is characterized in that the transport of silicon carbide from the gas phase to the substrate is carried out with the use of iron, for which purpose iron is locally provided on the substrate and exposed to a gas phase containing silicon and carbon at temperatures between 1150° C. and 1230° C., preferably between 1180° C. and 1210° C., during which process the silicon carbide is deposited on the substrate, via the iron as a transport phase, in the form of whiskers of circular cross-section.

Suitable substrates which can be used in the method according to the invention are in general all those which can resist the said temperatures and which do not or slightly react with the iron, for example, silicon carbide, alumina and graphite.

The iron may be provided on the substrate in a variety of ways. Very satisfactory results are obtained by sprinkling powdered iron or by vapour deposition for instance by evaporation in vacuum. In order to obtain as far as possible whisker growth of uniform thickness, it is advantageous to ensure that powdered iron of uniform grain size is used or, in the case of vapour deposition, that iron dots of uniform size are deposited so that drops of uniform size are formed on the substrate upon heating. When using a substrate of graphite, which may react with the iron, although only slightly, it is advisable, when using deposited layers, to use a layer thickness which is not too small, for instance not smaller than $1\mu$.

The thickness of the crystals obtained depends on the size of the iron drops from which they are deposited on the substrate. This fact may be utilized for obtaining crystals of a predetermined thickness. So, out of iron drops having diameters ranging from 2 to $200\mu$ silicon carbide whiskers having circular cross-sections with diameters ranging from about 1 to $100\mu$ may be obtained.

Further growth of the crystals for increasing their cross-section may be effected in a separate process by epitaxial growth at temperatures below 2000° C., for example from a hydrogen atmosphere containing methylchlorosilane at 1500° C.

Usually most crystals obtained will be cubic. The cubic growth may be facilitated by admixing silicon to the iron. Hexagonal whiskers even of a given polytype may be obtained by carrying out the growth on prismatic and pyramidal faces of silicon carbide crystals of the relevant polytype, which can be manufactured in comparatively large dimensions, for example, by the method described in U.S. patent specification No. 2,854,364.

To form the gases containing silicon and carbon for the formation of silicon carbide, all sorts of substances and combinations of substances may be used in the method according to the invention. Suitable substances are, for example, alkylhalogen silanes, such as methylchlorosilanes, or mixtures of hydrocarbons with silicon tetrahalides or with halogen silanes. In these cases the presence of hydrogen in the gas phase is necessary for obtaining the required pyrolytic decomposition of the compounds. The presence of hydrogen is not required when using $SiH_4$, which readily dissociates and can be used in combination with a hydrocarbon. In this case an inert gas, for example, argon, may be used for dilution and as a carrier gas for the vapours containing silicon and carbon.

However, it is preferred to obtain the gas phase containing silicon and carbon with the aid of the inexpensive raw materials silicon dioxide and carbon in an atmosphere of hydrogen, since an atmosphere with concentrations suitable for crystallisation is thus readily obtained at the temperatures used.

The invention relates not only to the method described, but also to filamentary bodies (whiskers) of circular cross-section, such as spindles, for instance for micromotors and watches, pin-gauges and the like, consisting of silicon carbide, single crystals of circular cross-section obtained by the method.

The method according to the invention may be carried out with the use of a device as shown in cross-section in FIG. 1 of the accompanying diagrammatic drawing.

FIG. 1 shows a graphite crucible 1 which is closed by a cover 2. So as to permit entrance of the gas atmosphere maintained around the crucible. A substrate 4 is placed on a graphite support 3. The crucible 1 is provided with thermal isolation 5 of graphite felt.

The whole is placed in an envelope comprising a quartz tube 6, which is surrounded by a glass tube 7 for water cooling.

The crucible 1, which can be heated by an inductance coil 8, contains a mixture of silicon dioxide and powdered carbon 9, from which a gas phase containing silicon and carbon may be formed upon heating in an atmosphere of hydrogen which is maintained within the envelope 6.

EXAMPLE 1

For whisker growth, the substrate used is a graphite plate 4 as shown in FIG. 1. Iron grains of $20\mu$ are laid on the plate 4. By heating at 1190° for 30 hours silicon carbide whiskers 10 of circular cross-section mostly having cubic crystal structure and approximately 3 cms. long and $10\mu$ in diameter are obtained.

EXAMPLE 2

Whiskers obtained in the manner as has been described in Example 1, after removal of the iron still present at one end after the VLS-growth, are heated at 1500° C. for 3 hours in an atmosphere of hydrogen to which 0.1% of methyldichlorosilane has been added. During this process the diameter of the crystals increases from $10\mu$ to $50\mu$ due to epitaxial growth, the cross-section remaining circular.

EXAMPLE 3

Figure 2:
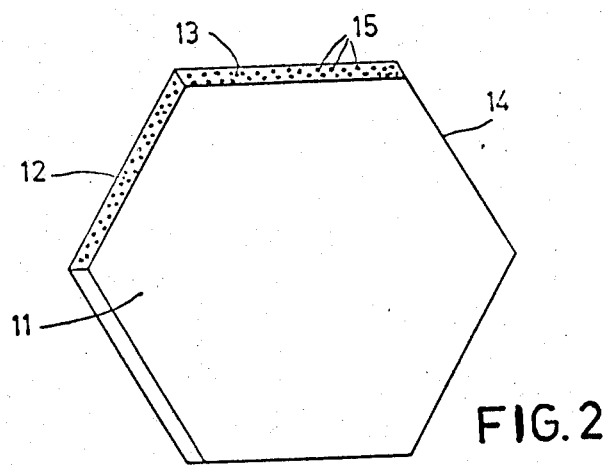

The substrate used is a hexagonal silicon carbide crystal 11 of the type 8 H, as shown in FIG. 2. Iron is vapour deposited on prismatic faces 12, 13 and 14 of the crystal by means of suitable masks, resulting in iron dots 15 which, upon heating, yield iron drops corresponding to those obtainable from grains of $100\mu$ in diameter.

The crystal is subsequently placed on the support 3 of the device of FIG. 1 and heated in this device at 1210° C. for 24 hours. Whiskers of 1 cm. long and $50\mu$ in diameter which consist of hexagonal silicon carbide of the type 8 H, then grow on the crystal faces.

What is claimed is:

1. A method of manufacturing filamentary crystals of silicon carbide having a circular cross-section comprising the steps of providing a hexagonal silicon carbide crystal substrate in a furnace having at a surface of said substrate iron in finely-divided form, heating said substrate to a temperature of at least 1150° and not greater than 1230° C.; contacting said substrate with an atmosphere containing silicon and carbon whereby said iron forms iron droplets to dissolve said silicon and carbon, maintaining said temperature and continuing to contact said substrate with said atmosphere until silicon carbide is deposited on said substrate in the form of filamentary crystals of silicon carbide having a circular cross-section.

2. A method as claimed in claim 1 wherein said iron droplets are of uniform size.

3. A method as claimed in claim 1 wherein growth of the crystals for increasing their cross-section is effected in a separate process by epitaxial growth at temperatures below 2000° C. wherein said epitaxial growth takes place in a hydrogen atmosphere containing at least a small amount of methylchlorosilane.

4. A method as claimed in claim 1 wherein cubic crystal growth is facilitated by adding silicon to said iron.

5. A method as claimed in claim 1, wherein for obtaining hexagonal crystals of a given polytype, the growth is effected on prismatic or pyramidal faces of a silicon carbide crystal of this polytype.

6. A method as claimed in claim 1, wherein the gas phase containing silicon and carbon is developed from silicon dioxide and carbon in the presence of hydrogen.

7. A method as claimed in claim 1 in which the temperature at which the droplets are formed is between 1180° and 1210° C.

References Cited

UNITED STATES PATENTS

| | | | |
|---|---|---|---|
| 3,161,473 | 12/1964 | Pultz | 23—208 |
| 3,230,053 | 1/1966 | Wakelyn et al. | 23—301 |
| 3,246,950 | 4/1966 | Gruber | 23—208 |
| 3,346,414 | 10/1967 | Ellis et al. | 23—223.5 |
| 3,356,618 | 12/1967 | Rich et al. | 117—106 |
| 3,382,113 | 5/1968 | Ebert et al. | 23—208 A X |

OTHER REFERENCES

O'Connor et al.: "Silicon Carbide," 1960, pages 73–83.

O'Connor et al.: "Silicon Carbide," 1960, pages 115–123.

Patrick et al.: "Physical Review," vol. 143, pages 526–536 (March 1966).

MILTON WEISSMAN, Primary Examiner